UNITED STATES PATENT OFFICE.

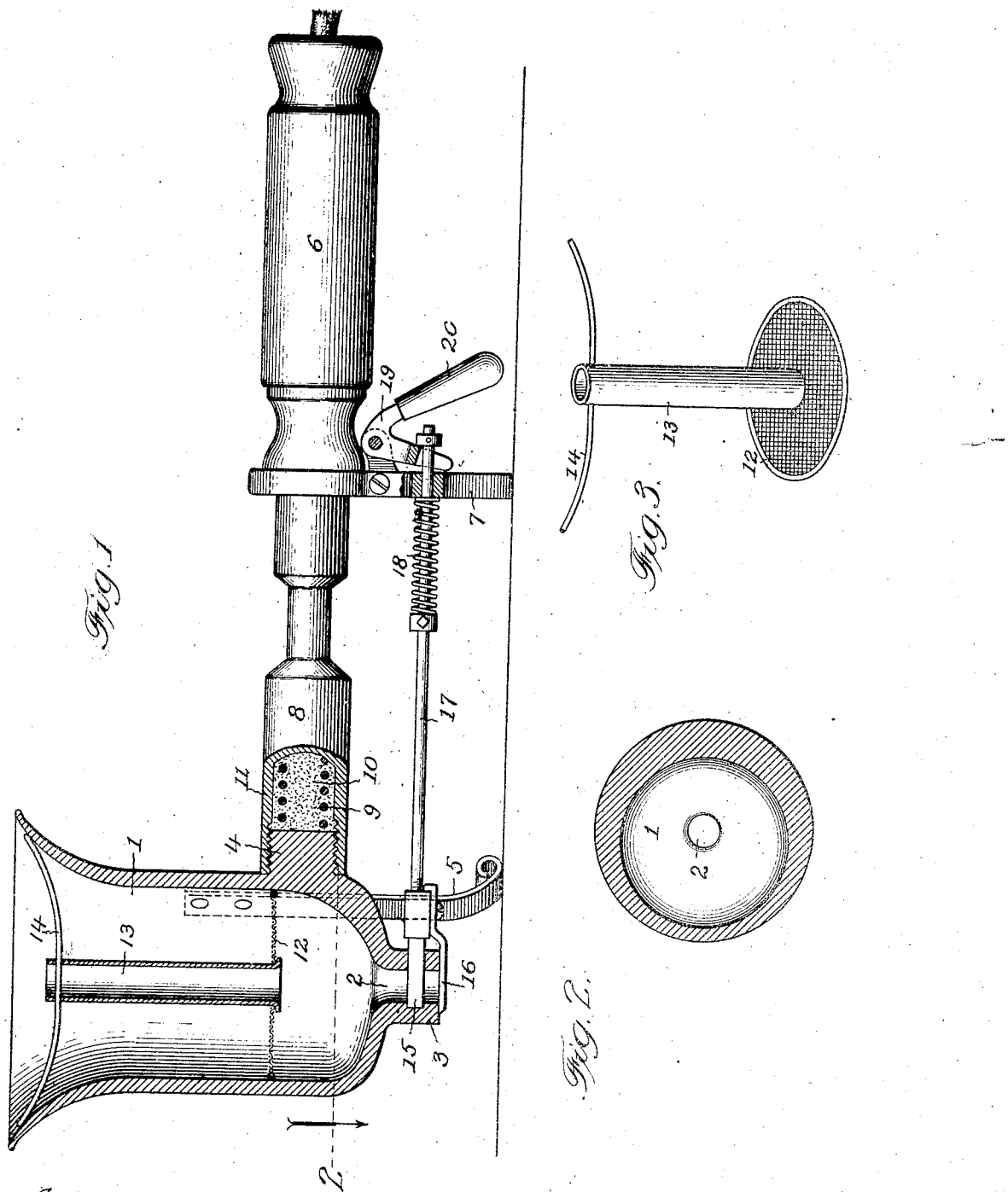

JAMES G. DICKSON, OF CHICAGO, ILLINOIS, ASSIGNOR OF ONE-HALF TO GEORGE F. DICKSON, OF CHICAGO, ILLINOIS.

WAX-MELTER.

1,007,188.   Specification of Letters Patent.   Patented Oct. 31, 1911.

Application filed March 9, 1911. Serial No. 613,471.

*To all whom it may concern:*

Be it known that I, JAMES G. DICKSON, a citizen of the United States of America, and a resident of Chicago, in the county of Cook, State of Illinois, have invented certain new and useful Improvements in Wax-Melters, of which the following is a specification.

This invention relates to an apparatus for melting and dispensing sealing wax in the usual sealing of packages of value, and has for its object to provide a simple and efficient combination of parts adapted to effect a ready fusion of the sealing wax, and to discharge controllable quantities of the molten wax as required, all as will hereinafter more fully appear.

In the accompanying drawings:—Figure 1, is a longitudinal sectional elevation of a sealing wax apparatus embodying the present invention. Fig. 2, is a detail horizontal section on line x—x, Fig. 1. Fig. 3, is a detail perspective view of the removable strainer.

Similar numerals of reference indicate like parts in the several views.

Referring to the drawings, 1 represents the melting pot having an open top or mouth which is preferably of the flaring form shown with a view to prevent accidental overflow of the wax from flowing down the outer surface of the pot to clog the outflow at the lower end of the pot. The bottom of the pot is closed and formed with a central outlet orifice 2, which is continued down through the outlet neck 3 which carries the controlling valve hereinafter described.

4 is a solid externally screw-threaded lug on the side of the melting pot 1, and a short distance above the bottom of the same, for the attachment of an electric heating device hereinafter described, and a material part of the present invention in connection with said lug and its arrangement near the bottom of the pot consists in making the wall of the pot of an increased thickness near said lug with a gradual decrease in the thickness away from said lug, as illustrated more particularly in Fig. 2, and which is very effectively accomplished by arranging the inner circular face of the pot eccentric to the outer circular face of the same at the before mentioned point or portion of the wall of the pot.

5 is one of a plurality of legs which are secured to the pot for holding the same in a raised position above a table top or the like.

6 is a handle by which the apparatus is carried from place to place, and which is provided with a supporting standard 7, which in conjunction with the above described legs 5 constitute the support for the apparatus above a table top or the like.

8 is an electric heater of any usual construction, such as a resistance coil 9 embodied in a mass of refractory insulating material 10, which in turn is inclosed in a cylindrical metal casing 11, one end of which is screw-threaded to fit the screw-threaded lug 4 of the melting pot above described. The other end of the casing 11 is suitably connected to the handle 6 above described. With the described construction the heat from the resistance coil 9 is conducted through the lug 4 and the progressively thinned portion of the pot wall to the sealing wax within the pot in an even and uniform manner, to melt the wax and maintain it in a properly molten condition.

12 is a strainer of a circular flat form fitting the bore of the melting pot intermediate its height and adapted to support sticks of sealing wax which are to be melted.

13 is a central tubular stem, open at top and bottom, and carrying at its lower end the strainer 12 aforesaid. The open bore of said stem provides a vent for the vapor and gases from the molten wax in the lower part of the melting pot and prevents in a very effective manner the boiling over of the wax which would otherwise occur during a continued operation of the apparatus.

14 is a supporting bar or rod attached at its center to the upper end of the tubular stem 13, with its respective ends adapted to rest upon the margin or border of the melting pot to support the rest upon the margin or border of the melting pot to support the strainer 12 and stem 13 in proper position, and at the same time provide means for a ready removal of the said strainer and stem when required.

15 is a transverse valve member, preferably of the flat plug form shown, sliding in a valve way formed therefor in the discharge neck 3 above described, and intersecting the outlet passage 2 to control the same.

16 is a cut-off plate secured to and moving with the valve 15. Said plate slides against the underside of the discharge neck 3 and has a forward beveled end to effect a removal of the surplus wax from the underside of said neck and prevent continued dripping of the wax.

17 is a valve stem connected to the valve 15 and guided at its rear end in the standard 7 before described.

18 is a spring engaging said valve stem and tending to force the valve stem forward and hold the valve 15 closed.

19 is an angle lever pivoted to the aforesaid standard 7, with one arm in operative engagement with the valve stem 17; while the other arm is provided with a handle 20 for convenient manipulation in effecting an opening of the valve 15, against the stress of the spring 18.

Having thus fully described my said invention, what I claim as new and desire to secure by Letters Patent, is:—

1. In a sealing wax melter, the combination of an open top melting pot having an outlet neck at bottom and a screw-threaded lug on its side, an electric heater having a housing screwing onto said screw-threaded lug, and a manually actuated valve controlling the outlet neck aforesaid, substantially as set forth.

2. In a sealing wax melter, the combination of an open top melting pot having an outlet neck at bottom and a screw-threaded lug on its side, an electric heater having a housing screwing onto said screw-threaded lug, and a manually actuated valve controlling the outlet neck aforesaid, the wall of the melting pot having its greatest thickness adjacent to said lug and progressively decreasing in thickness away from the same, substantially as set forth.

3. In a sealing wax melter, the combination of an open top melting pot having an outlet neck at bottom, a heater attached to said pot, a manually actuated valve controlling the outlet neck aforesaid, and a strainer arranged inside the melting pot a distance away from the bottom of the same and adapted to support sticks of sealing wax during the melting of the same, substantially as set forth.

4. In a sealing wax melter, the combination of an open top melting pot having an outlet neck at bottom, a heater attached to said pot, a manually actuated valve controlling the outlet neck aforesaid, a strainer arranged inside the melting pot a distance above the bottom of the same, a central tubular stem open at top and bottom and secured at its lower end to said strainer, and a supporting bar attached at its midlength to the upper end of said stem and adapted to rest upon the border of the melting pot, substantially as set forth.

5. In a sealing wax melter, the combination of an open top melting pot having an outlet neck at bottom, a heater attached to said pot, a manually actuated valve controlling the outlet neck aforesaid, and a cut-off plate carried by said valve and sliding against the underside of the outlet neck, substantially as set forth.

Signed at Chicago, Illinois, this 17th day of February, 1911.

JAMES G. DICKSON.

Witnesses:
HOWARD GOFF,
WILLIAM FRANZEN.